(12) United States Patent
Kudo

(10) Patent No.: US 12,227,623 B2
(45) Date of Patent: Feb. 18, 2025

(54) WATER-ABSORBING HYDROGEL AND METHOD FOR PRODUCING THE SAME

(71) Applicant: NISSAN CHEMICAL CORPORATION, Tokyo (JP)

(72) Inventor: Yoshihiro Kudo, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 583 days.

(21) Appl. No.: 16/495,020

(22) PCT Filed: Mar. 14, 2018

(86) PCT No.: PCT/JP2018/009984
§ 371 (c)(1),
(2) Date: Sep. 17, 2019

(87) PCT Pub. No.: WO2018/168933
PCT Pub. Date: Sep. 20, 2018

(65) Prior Publication Data
US 2020/0095384 A1 Mar. 26, 2020

(30) Foreign Application Priority Data
Mar. 17, 2017 (JP) .................................. 2017-053503

(51) Int. Cl.
*C08J 3/075* (2006.01)
*C08K 3/013* (2018.01)
(Continued)

(52) U.S. Cl.
CPC .............. *C08J 3/075* (2013.01); *C08K 3/013* (2018.01); *C08K 3/36* (2013.01); *C08K 7/20* (2013.01);
(Continued)

(58) Field of Classification Search
CPC .... C08J 3/075; C08J 2333/08; C08J 2341/00; C08K 3/013; C08K 3/36; C08K 7/20
See application file for complete search history.

(56) References Cited

U.S. PATENT DOCUMENTS

| | | | | |
|---|---|---|---|---|
| 2010/0100066 A1* | 4/2010 | Azad | ....................... | A61L 15/24 604/372 |
| 2012/0258851 A1* | 10/2012 | Nakatsuru | ................... | C08J 3/12 502/7 |
| 2015/0274899 A1* | 10/2015 | Kudo | ...................... | C08L 33/02 524/388 |

FOREIGN PATENT DOCUMENTS

| | | |
|---|---|---|
| EP | 3375824 A1 | 9/2018 |
| JP | 2003-190201 A | 7/2003 |

(Continued)

OTHER PUBLICATIONS

Aug. 3, 2021 Office Action issued in Taiwanese Patent Application No. 107109013.

(Continued)

*Primary Examiner* — Robert S Jones, Jr.
*Assistant Examiner* — Jiangtian Xu
(74) *Attorney, Agent, or Firm* — Oliff PLC

(57) ABSTRACT

A hydrogel that exhibits excellent water absorbency even when dried, and has flexibility, shape stability, and shape retention properties, and a method for producing the hydrogel. A hydrogel comprising a water-soluble organic polymer, a silicate, a dispersant for the silicate, and a water-absorbing polymer. A method for producing a hydrogel including a formation step of forming a hydrogel comprising a water-soluble organic polymer, a silicate, a dispersant for the silicate, a water-absorbing polymer, and at least one solvent selected from the group having water and a water-soluble (Continued)

organic solvent, and as an optical step, a solvent removal step of removing a portion of the solvent in the hydrogel.

7 Claims, 1 Drawing Sheet

(51) Int. Cl.
    *C08K 3/36*     (2006.01)
    *C08K 7/20*     (2006.01)

(52) U.S. Cl.
    CPC ........ *C08J 2333/08* (2013.01); *C08J 2341/00* (2013.01)

(56) References Cited

FOREIGN PATENT DOCUMENTS

| | | |
|---|---|---|
| JP | 2006-070211 A | 3/2006 |
| WO | 2014/046127 A1 | 3/2014 |
| WO | 2014/046136 A1 | 3/2014 |
| WO | 2015/068837 A1 | 5/2015 |
| WO | 2015/125968 A1 | 8/2015 |
| WO | 2016/063836 A1 | 4/2016 |
| WO | 2016/158349 A1 | 10/2016 |

OTHER PUBLICATIONS

Oct. 26, 2020 Extended Search Report issued in European Patent Application No. 18766879.3.
Jun. 19, 2018 International Search Report issued in International Patent Application No. PCT/JP2018/009984.
Jun. 19, 2019 Written Opinion of the International Searching Authority issued in International Patent Application No. PCT/JP2018/009984.
H. Takeno et al, "Structural and Mechanical Properties of Composite Hydrogel Composed of Polymer and Nanoparticle" Preprints of the 61st Annual Meeting of the Society of Polymer Science, Japan, vol. 61, No. 1 p. 683, 2012.
Apr. 27, 2022 Notice of Reasons for Refusal issued in Japanese Patent Application No. 2018-554127.
Aug. 31, 2023 Office Action issued in European Patent Application No. 18766879.3.

* cited by examiner

WATER-ABSORBING HYDROGEL AND METHOD FOR PRODUCING THE SAME

TECHNICAL FIELD

The present invention relates to a water-absorbing gel and a method for producing the same; more specifically, the present invention relates to a water-absorbing hydrogel that exhibits excellent water absorbency even when dried, and has flexibility, shape stability, and shape retention properties, a dry gel, a sheet-shaped gel, and a method for producing the same.

BACKGROUND ART

As hydrogels having water absorption capacity, water-absorbing polymers are widely used as diapers and the like. However, because such hydrogels in dried form are hard and inflexible, and thus, are readily broken, it is difficult for them to be processed into a sheet and used. In general, water-absorbing polymers are ground into a particulate or powder form and used. To prevent the polymers from dispersing or flowing out, they need to be covered with a support such as fibers or the like and used. Thus, the polymers need to be processed in consideration of shape retention or expansion due to water absorption, which places constraints when they are used. Hence, there is a demand for a water-absorbing material that can be used without being covered with a support.

Various hydrogels or dry gels have been previously proposed as water-absorbing materials. By way of example, a self-supporting organic-inorganic composite hydrogel that can be readily produced simply by mixing a polyelectrolyte, clay particles, and a dispersant in water at room temperature without a polymerization reaction (Non-Patent Document 1) and a dry gel having flexibility (Patent Document 1) have been reported.

PRIOR ART DOCUMENTS

Patent Document

Patent Document 1: WO 2015/125968

Non-Patent Document

Non-Patent Document 1: Preprints of the 61st Annual Meeting of the Society of Polymer Science, Japan, Vol. 61, No. 1, p. 683 (2012)

SUMMARY OF THE INVENTION

Problem to be Solved by the Invention

The self-supporting organic-inorganic composite hydrogel disclosed in Non-Patent Document 1 absorbs water by being immersed in water, for example, and moreover, even if the hydrogel is dried, it turns into a hydrogel again when it is allowed to absorb water by being immersed in water, for example. Thus, like a water-absorbing polymer, the self-supporting organic-inorganic composite hydrogel can be used as a water-absorbing material. However, this hydrogel in dried form is hard, and has substantially no flexibility.

On the other hand, the dry gel disclosed in Patent Document 1 also has water absorbency, but has room for improvement in terms of gel strength and water absorption rate.

Accordingly, the present invention has been made in view of the foregoing circumstances, and an object of the present invention is to provide a hydrogel that exhibits excellent water absorbency even when dried, and has flexibility, shape stability, and shape retention properties, and provide a method for producing the same.

Means for Solving the Problem

As a result of extensive research to solve the aforementioned problem, the present inventors have found that when a water-absorbing polymer that is a water-absorbing material is used in a hydrogel containing a water-soluble organic polymer, a silicate, and a dispersant for the silicate, a hydrogel can be provided that has excellent water absorbency even when dried, and exhibits flexibility, shape stability, and shape retention properties, thus accomplishing the present invention.

In summary, a first aspect of the present invention relates to a hydrogel comprising a water-soluble organic polymer (A), a silicate (B), a dispersant (C) for the silicate, and a water-absorbing polymer (D).

A second aspect of the present invention relates to the hydrogel according to the first aspect, wherein the water-absorbing polymer (D) is at least one selected from the group consisting of a crosslinked polyacrylate and a crosslinked polyvinyl sulfonate.

A third aspect of the present invention relates to the hydrogel according to the first or second aspect, further comprising a reinforcing material (E).

A fourth aspect of the present invention relates to the hydrogel according to the third aspect, wherein the reinforcing material (E) is a fiber.

A fifth aspect of the present invention relates to the hydrogel according to the fourth aspect, wherein the fiber is at least one selected from the group consisting of pulp, cellulose fibers, rayon fibers, nylon fibers, polyester fibers, polypropylene fibers, acrylic fibers, vinylon fibers, aramid fibers, acetate fibers, and glass fibers.

A sixth aspect of the present invention relates to the hydrogel according to any one of the first to fifth aspects, wherein the water-soluble organic polymer (A) is a fully or partially neutralized polyacrylate having a weight average molecular weight of 1,000,000 to 10,000,000.

A seventh aspect of the present invention relates to the hydrogel according to any one of the first to sixth aspects, wherein the silicate (B) is at least one water-swellable silicate particle selected from the group consisting of smectite, bentonite, vermiculite, and mica.

An eighth aspect of the present invention relates to the hydrogel according to any one of the first to seventh aspects, wherein the dispersant (C) is at least one selected from the group consisting of a fully or partially neutralized salt of orthophosphoric acid, a fully or partially neutralized salt of pyrophosphoric acid, a fully or partially neutralized salt of tripolyphosphoric acid, a fully or partially neutralized salt of tetraphosphoric acid, a fully or partially neutralized salt of hexametaphosphoric acid, a fully or partially neutralized salt of polyphosphoric acid, a fully or partially neutralized salt of etidronic acid, sodium poly(meth)acrylate, ammonium poly(meth)acrylate, sodium acrylate/sodium maleate copolymer, ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

A ninth aspect of the present invention relates to the hydrogel according to any one of the first to eighth aspects, further comprising a water-soluble organic solvent (F).

A tenth aspect of the present invention relates to the hydrogel according to the ninth aspect, wherein the water-soluble organic solvent (F) is a nonvolatile water-soluble organic solvent.

An eleventh aspect of the present invention relates to the hydrogel according to the tenth aspect, wherein the nonvolatile water-soluble organic solvent is at least one selected from the group consisting of glycerin, diglycerin, ethylene glycol, and 1,3-butylene glycol.

A twelfth aspect of the present invention relates to the hydrogel according to any one of the first to eleventh aspects, wherein the content of the solvent in the hydrogel is 50% by mass or more.

A thirteenth aspect of the present invention relates to a water-absorbing hydrogel, wherein the hydrogel according to first to twelfth aspects has a degree of water absorption such that a mass ratio of the hydrogel after water absorption to the hydrogel before water absorption is twice or more.

A fourteenth aspect of the present invention relates to a dry gel comprising a water-soluble organic polymer (A), a silicate (B), a dispersant (C) for the silicate, and a water-absorbing polymer (D).

A fifteenth aspect of the present invention relates to the dry gel according to the fourteenth aspect, wherein the content of the solvent in the gel is less than 50% by mass.

A sixteenth aspect of the present invention relates to a sheet-shaped gel comprising a water-soluble organic polymer (A), a silicate (B), a dispersant (C) for the silicate, and a water-absorbing polymer (D).

A seventeenth aspect of the present invention relates to the sheet-shaped gel according to the sixteenth aspect, further comprising a reinforcing material (E).

An eighteenth aspect of the present invention relates to a method for producing a hydrogel comprising (a1) a formation step of forming a hydrogel comprising a water-soluble organic polymer (A), a silicate (B), a dispersant (C) for the silicate, a water-absorbing polymer (D), and at least one solvent selected from the group consisting of water and a water-soluble organic solvent (F).

A nineteenth aspect of the present invention relates to the method for producing a hydrogel according to the eighteenth aspect, further comprising (b1) a solvent removal step of removing a portion of the solvent in the hydrogel.

A twentieth aspect of the present invention relates to a method for producing a dry gel comprising:
(a2) a formation step of forming a gel comprising a water-soluble organic polymer (A), a silicate (B), a dispersant (C) for the silicate, a water-absorbing polymer (D), and at least one solvent selected from the group consisting of water and a water-soluble organic solvent (F); and
when the content of the solvent in the gel is 50% by mass or more, (b2) a solvent removal step of removing a portion or all of the solvent in the gel to adjust the content of the solvent in the gel to less than 50% by mass.

A twenty-first aspect of the present invention relates to a method for producing a sheet-shaped gel comprising:
(a3) a formation step of forming a sheet-shaped gel comprising a water-soluble organic polymer (A), a silicate (B), a dispersant (C) for the silicate, a water-absorbing polymer (D), and at least one solvent selected from the group consisting of water and a water-soluble organic solvent (F); and
when the content of the solvent in the gel is 50% by mass or more, (b3) a solvent removal step of removing a portion or all of the solvent in the gel to adjust the content of the solvent in the gel to less than 50% by mass.

Effects of the Invention

The hydrogel of the present invention achieves the effect of exhibiting excellent water absorbency even when dried, and having a degree of flexibility such that it is unlikely to break when bent, a degree of strength such that it is unlikely to deform when subjected to a force such as stretching (so-called shape stability), and the property of substantially retaining a processed shape formed by bending or the like (so-called shape retention properties). Thus, because the hydrogel of the present invention has flexibility, it can be readily processed into a sheet, or processed by cutting, bending, or the like; therefore, the range of applications of the hydrogel is expected to expand.

The dry gel of the present invention achieves the effect of exhibiting excellent water absorbency, and having flexibility, shape stability, and shape retention properties.

The sheet-shaped gel of the present invention achieves the effect of exhibiting excellent water absorbency, and having flexibility, shape stability, and shape retention properties. In particular, the sheet-shaped gel of the present invention comprises a reinforcing material, thereby remarkably exhibiting shape stability and shape retention properties.

The method for producing a hydrogel, a dry gel, or a sheet-shaped gel of the present invention achieves the effect of being capable of readily preparing it by mixing a water-soluble organic polymer (A), a silicate (B), a dispersant (C) for the silicate, a water-absorbing polymer (D), and water or a hydrous solvent. Furthermore, the method for producing a hydrogel, a dry gel, or a sheet-shaped gel of the present invention achieves the effect of adjusting the degrees of water absorbency, flexibility, shape stability, and shape retention properties of the gel, by changing the content of the solvent in the gel.

MODES FOR CARRYING OUT THE INVENTION

[Hydrogel]

Figure 1:
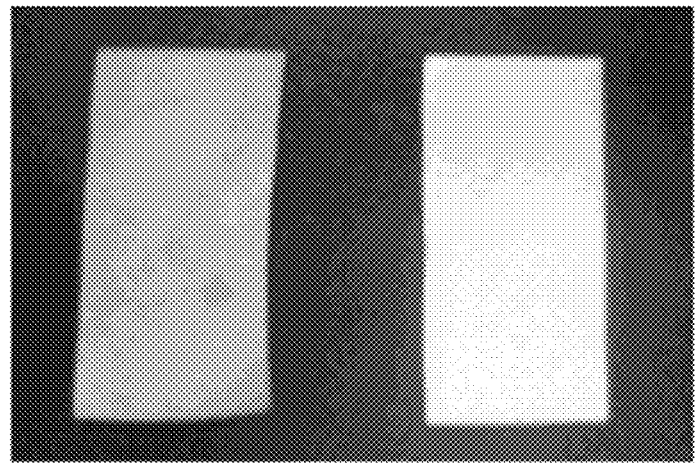
FIG. 1 is a photograph showing sheet-shaped gels used in the bending test in Example 5 (the left one is the sheet-shaped gel of Comparative Example 2, and the right one is the sheet-shaped gel of Example 2).

The hydrogel of the present invention comprises a water-soluble organic polymer (A), a silicate (B), a dispersant (C) for the silicate, a water-absorbing polymer (D), and optionally a reinforcing material (E) and/or a water-soluble organic solvent (F); however, it may optionally contain any other components, as required, as long as the intended effects of the present invention are not impaired.

<Component (A): Water-Soluble Organic Polymer>

The component (A) of the present invention is a water-soluble organic polymer, and is preferably a water-soluble organic polymer having an organic acid structure, an organic acid salt structure, or an organic acid anion structure. The water-soluble organic polymer having an organic acid structure, an organic acid salt structure, or an organic acid anion structure is a polymer that has, as a side chain of the organic polymer, a plurality of organic acid groups such as carboxyl groups, sulfonyl groups, and phosphonyl groups, or a salt structure or an anion structure of the organic acid groups, and dissolves freely in water.

Examples of the water-soluble organic polymer (A) having an organic acid structure, an organic acid salt structure, or an organic acid anion structure include those having carboxyl groups such as poly(meth)acrylates, salts of carboxyvinyl polymers, and salts of carboxymethyl cellulose; those having sulfonyl groups such as salts of polystyrene sulfonic acid; and those having phosphonyl groups such as polyvinyl phosphonates. Examples of the salts include sodium salts, ammonium salts, potassium salts, and lithium salts. These salts may be fully or partially neutralized salts.

In the present invention, the term "(meth)acrylic acid" refers to both acrylic acid and methacrylic acid.

Furthermore, the water-soluble organic polymer (A) may be crosslinked or copolymerized, and can be used either as a fully neutralized product in which all of the organic acid structure is a salt structure, or as a partially neutralized product in which an organic acid structure and an organic acid salt structure coexist.

The water-soluble organic polymer (A) preferably has a weight average molecular weight of 1,000,000 to 10,000,000, and more preferably 2,000,000 to 7,000,000, as calculated in terms of polyethylene glycol using gel permeation chromatography (GPC).

Furthermore, the water-soluble organic polymer (A) available as a commercial product preferably has a weight average molecular weight of 1,000,000 to 10,000,000, and more preferably 2,000,000 to 7,000,000, as the weight average molecular weight shown on the commercial product In the present invention, the water-soluble organic polymer (A) preferably has a carboxylic acid structure, a carboxylic acid salt structure, or a carboxy anion structure; more preferably, it is a fully or partially neutralized polyacrylate; specifically, it is preferably fully or partially neutralized sodium polyacrylate; and particularly preferably, it is fully or partially neutralized non-crosslinked high-polymerization-degree sodium polyacrylate having a weight average molecular weight of 2,000,000 to 7,000,000. In the case of partial neutralization, the degree of neutralization is 10 to 90%, and preferably 30 to 80%.

The content of the water-soluble organic polymer (A) is 0.01 to 20% by mass, and preferably 0.1 to 10% by mass, relative to 100% by mass of the hydrogel.

<Component (B): Silicate>

The component (B) of the present invention is a silicate, and is preferably a water-swellable silicate particle.

Examples of the silicate (B) include water-swellable silicate particles such as smectite, bentonite, vermiculite, and mica. The silicate (B) is preferably a silicate that forms a colloid in water or a hydrous solvent as a dispersion medium. The term "smectite" refers collectively to clay minerals having swelling properties, such as montmorillonite, beidellite, nontronite, saponite, hectorite, and stevensite.

Examples of shapes of primary particles of the silicate particle include a disc shape, a plate shape, a spherical shape, a particle shape, a cubic shape, a needle shape, a rod shape, and an amorphous shape. For example, a disc or plate shape having a diameter of 5 to 1,000 nm is preferred. For example, LAPONITE XLG mentioned below as an example has a disc shape having a diameter of 20 to 100 nm.

Specific preferred examples of the silicate include layered silicates, and examples thereof that are readily available as commercial products include LAPONITE XLG (synthetic hectorite), XLS (synthetic hectorite, containing sodium pyrophosphate as a dispersant), XL21 (sodium magnesium fluorosilicate), RD (synthetic hectorite), RDS (synthetic hectorite, containing an inorganic polyphosphate as a dispersant), S482 (synthetic hectorite, containing a dispersant), and EP (organic modified hectorite) from BYK Additives & Instruments; KUNIPIA (registered trademark of Kunimine Industries Co., Ltd., montmorillonite), SUMECTON (registered trademark of Kunimine Industries Co., Ltd.) SA (synthetic saponite), ST (synthetic stevensite), and SWF (synthetic hectorite) from Kunimine Industries Co., Ltd.; and BENGEL (registered trademark of Hojun Co., Ltd., purified products of natural bentonite) from Hojun Co., Ltd.

The content of the silicate (B) is 0.01 to 20% by mass, and preferably 0.1 to 15% by mass, relative to 100% by mass of the hydrogel.

<Component (C): Dispersant for the Silicate>

The component (C) of the present invention is a dispersant for the silicate (B), and is preferably a dispersant for the water-swellable silicate particle.

A dispersant or a deflocculant used for the purpose of improving the dispersibility of a silicate or delaminating a layered silicate can be used as the dispersant (C) for the silicate. For example, a phosphate-based dispersant, a carboxylate-based dispersant, a substance that acts as an alkali, a substance that reacts with a polyvalent cation to form an insoluble salt or a complex salt, or an organic deflocculant can be used.

Examples of the dispersant (C) for the silicate include phosphate-based dispersants such as a fully or partially neutralized salt of orthophosphoric acid, a fully or partially neutralized salt of pyrophosphoric acid, a fully or partially neutralized salt of tripolyphosphoric acid, a fully or partially neutralized salt of tetraphosphoric acid, a fully or partially neutralized salt of hexametaphosphoric acid, a fully or partially neutralized salt of polyphosphoric acid, and a fully or partially neutralized salt of etidronic acid (examples of the salts include sodium salts); carboxylate-based dispersants such as sodium poly(meth)acrylate, ammonium poly(meth)acrylate, sodium acrylate/sodium maleate copolymer, and ammonium acrylate/ammonium maleate copolymer; substances that act as alkalis such as sodium hydroxide and hydroxylamine; substances that react with polyvalent cations to form insoluble salts or complex salts such as sodium carbonate and sodium silicate; and other organic deflocculants such as polyethylene glycol, polypropylene glycol, sodium humate, and sodium ligninsulfonate.

Among the above, preferred are phosphate-based dispersants, carboxylate-based dispersants, and other organic deflocculants; more preferred are sodium pyrophosphate, sodium etidronate, low-polymerization-degree sodium polyacrylate having a weight average molecular weight of 500 to 20,000, and polyethylene glycol having a weight average molecular weight of 500 to 20,000 (such as PEG 900); and most preferred is low-polymerization-degree sodium polyacrylate having a weight average molecular weight of 500 to 20,000.

Low-polymerization-degree sodium polyacrylate is known to act as a dispersant by a mechanism in which, for example, it interacts with silicate particles to produce carboxy anion-derived negative charges on the particle surface, and the silicate is dispersed through repulsion of charges.

The content of the dispersant (C) is 0.001 to 20% by mass, and preferably 0.01 to 10% by mass, relative to 100% by mass of the hydrogel.

When a silicate containing a dispersant is used as the component (B), it is optional to further add a dispersant as the component (C).

<Component (D): Water-Absorbing Polymer>

The component (D) of the present invention is a water-absorbing polymer, preferably a water-absorbing polymer having a crosslinked polycarboxylate structure or a crosslinked polyvinyl sulfonate structure, and more preferably a water-absorbing polymer having a crosslinked polycarboxylate structure.

Examples of the water-absorbing polymer (D) include crosslinked sodium polyacrylate, crosslinked sodium polyvinyl sulfonate, and a crosslinked copolymer of sodium acrylate with sodium vinylsulfonate, sodium styrenesulfonate, or sodium vinylphosphonate. Among the above, a crosslinked polyacrylate and a crosslinked polyvinyl sulfonate are preferred, and crosslinked sodium polyacrylate is more preferred.

Furthermore, the crosslinked sodium polyacrylate is preferably a powdery or particulate material, for example. The crosslinked sodium polyacrylate is preferably a particulate material having a particle diameter of 0.01 to 5 mm, and more preferably a particulate material having a particle diameter of 0.1 to 1 mm.

Specific examples of the water-absorbing polymer (D) include AQUALIC (registered trademark) CA and AQUALIC CS (from Nippon Shokubai Co., Ltd.), SUMIKA GEL (from Sumitomo Chemical Industry, Co., Ltd.), LANSEAL (from Toyobo Co., Ltd.), SANWET and AQUAPEARL (from San-Dia Polymers, Ltd.), KI-GEL (from Kuraray Trading Co., Ltd.), ARASORB (from Arakawa Chemical Industries, Co., Ltd.), and AQUA KEEP (from Sumitomo Seika Chemicals Co., Ltd.).

The water-absorbing polymers (D) can be used alone, or in combination of two or more.

The content of the water-absorbing polymer (D) is 0.01 to 20% by mass, and preferably 0.1 to 10% by mass, relative to 100% by mass of the hydrogel.

In the case where the amount of the water-absorbing polymer (D) is excessive, the amount of the water-soluble organic polymer (A), the silicate (B), and the dispersant (C) may decrease relatively, which may cause a decrease in the strength of the hydrogel of the present invention. Furthermore, because the water absorption power of the water-absorbing polymer (D) per se is high, the water-absorbing polymer (D) may absorb the water in the solvent during the production of the hydrogel of the present invention, and mixing of the components may become difficult.

<Component (E): Reinforcing Material>

The hydrogel of the present invention can contain a reinforcing material as the component (E).

In the present invention, the use of the reinforcing material can further improve the shape stability and the shape retention properties of the hydrogel of the present invention when it is processed into a sheet, and can maintain the flexibility and the water-absorption capacity while inhibiting the elasticity and the adsorption properties characteristic of a gel.

Examples of the reinforcing material (E) include fibers, and examples of the fibers include pulp, cellulose fibers, rayon fibers, nylon fibers, polyester fibers, polypropylene fibers, acrylic fibers, vinylon fibers, aramid fibers, acetate fibers, and glass fibers. Among the above, cellulose filter paper is preferred.

The reinforcing materials (E) can be used alone, or in combination of two or more.

When the hydrogel of the present invention contains the component (E), the content of the reinforcing material (E) is 0.1 to 20% by mass, and preferably 0.5 to 10% by mass, relative to 100% by mass of the hydrogel.

<Component (F): Water-Soluble Organic Solvent>

The hydrogel of the present invention can contain a water-soluble organic solvent as the component (F).

The water-soluble organic solvent (F) is preferably a nonvolatile water-soluble organic solvent.

Examples of the nonvolatile water-soluble organic solvent include glycerin, diglycerin, ethylene glycol, and 1,3-butylene glycol, and glycerin and diglycerin are preferred.

The hydrogel of the present invention may further contain a volatile water-soluble organic solvent. Examples of the volatile water-soluble organic solvent include methanol, ethanol, propanol, isopropyl alcohol, and acetone.

In the present invention, these water-soluble organic solvents may be used alone, or as a mixture of two or more.

When the hydrogel of the present invention contains the component (F), the content of the water-soluble organic solvent (F) is 0.5 to 10% by mass, and preferably 1.0 to 5.0% by mass, relative to 100% by mass of the hydrogel.

<Other Additives>

The hydrogel of the present invention can contain, as required, additives such as a surfactant, a water-soluble polymer, and a preservative that play auxiliary roles with respect to the water absorption function, strength, processability, and the like in the formation of a gel, as long as the effects of the present invention are not impaired.

Examples of the surfactant include anionic surfactants, cationic surfactants, and nonionic surfactants. An anionic surfactant is preferred, and sodium alkylbenzenesulfonate is more preferred.

Examples of the water-soluble polymer include water-soluble polymers other than the water-soluble organic polymer (A), such as polyethylene glycol, polypropylene glycol, polyvinyl alcohol, and poly(meth)acrylamide.

As the preservative, phenoxyethanol and 1,3-butylene glycol are preferred.

When the hydrogel of the present invention contains other additives, the content of the other additives is 0.01 to 5.0% by mass, and preferably 0.1 to 1.0% by mass, relative to 100% by mass of the hydrogel.

Examples of preferred combinations of the water-soluble organic polymer (A), the silicate (B), the dispersant (C) for the silicate, and the water-absorbing polymer (D) include a combination including, relative to 100% by mass of the hydrogel, 0.1 to 10% by mass of fully or partially neutralized non-crosslinked high-polymerization-degree sodium polyacrylate having a weight average molecular weight of 2,000,000 to 7,000,000 as the component (A); 0.1 to 15% by mass of water-swellable smectite or saponite as the component (B); 0.01 to 10% by mass of sodium pyrophosphate or 0.01 to 10% by mass of low-polymerization-degree sodium polyacrylate having a weight average molecular weight of 500 to 20,000 as the component (C); and 0.1 to 10% by mass of crosslinked sodium polyacrylate as the component (D).

Furthermore, when the hydrogel of the present invention contains the component (E), examples of preferred combinations of the water-soluble organic polymer (A), the silicate (B), the dispersant (C) for the silicate, the water-absorbing polymer (D), and the reinforcing material (E) include a combination including, relative to 100% by mass of the hydrogel, 0.1 to 10% by mass of fully or partially neutralized non-crosslinked high-polymerization-degree sodium polyacrylate having a weight average molecular weight of 2,000,000 to 7,000,000 as the component (A); 0.1 to 15% by mass of water-swellable smectite or saponite as the component (B); 0.01 to 10% by mass of sodium pyrophosphate or 0.01 to 10% by mass of low-polymerization-degree sodium polyacrylate having a weight average molecular weight of 500 to 20,000 as the component (C); 0.1 to 10% by mass of crosslinked sodium polyacrylate as the component (D); and 0.5 to 10% by mass of cellulose filter paper as the component (E).

Furthermore, the degrees of water absorbency, flexibility, shape stability, and shape retention properties of the hydrogel of the present invention can be adjusted by adjusting the content of the solvent in the hydrogel. From the viewpoint of allowing the hydrogel to exhibit better water absorbency, flexibility, shape stability, and shape retention properties, the content of the solvent in the hydrogel of the present invention is 50 to 99% by mass, preferably 60 to 98% by mass, and more preferably 70 to 95% by mass.

[Water-Absorbing Hydrogel]

The water-absorbing hydrogel of the present invention comprises the water-soluble organic polymer (A), the silicate (B), the dispersant (C) for the silicate, and the water-absorbing polymer (D), wherein the hydrogel has a degree of water absorption such that a mass ratio of the hydrogel after water absorption to the hydrogel before water absorption is twice or more.

From the viewpoint of exhibiting better water absorbency, the degree of water absorption of the water-absorbing hydrogel of the present invention is preferably such that the mass ratio of the hydrogel after water absorption to the hydrogel before water absorption is 3 to 1,000 times, more preferably 5 to 1,000 times, and most preferably 5 to 500 times.

Furthermore, the water-absorbing hydrogel of the present invention can contain the components (E) and (F) and additives as optional components.

The components (A) to (F) and additives are as described in [Hydrogel] above.

[Dry Gel]

A dry gel can be obtained by removing a portion or all of the solvent in the hydrogel of the present invention. The dry gel is also included in the present invention.

In the present invention, in the dry gel, the content of the solvent in the gel is less than 50% by mass, specifically 0 to 49% by mass, preferably 0 to 30% by mass, and more preferably 0 to 20% by mass. The dry gel of the present invention also includes a dry gel containing no solvent in the gel.

The method of removing the solvent is not limited to a particular method; examples thereof include allowing it to dry at room temperature, heat drying, and freeze drying.

The temperature during drying is preferably −100 to 200° C., and more preferably −78 to 100° C.

Furthermore, drying can be performed under atmospheric pressure as well as reduced pressure, and the pressure is 0.1 to 100 kPa, and preferably 1 to 100 kPa.

[Sheet-Shaped Gel]

The sheet-shaped gel of the present invention contains the water-soluble organic polymer (A), the silicate (B), the dispersant (C) for the silicate, and the water-absorbing polymer (D). The sheet-shaped gel of the present invention preferably further contains the reinforcing material (E) to improve the strength.

The sheet-shaped gel of the present invention is a sheet-shaped (flat-shaped) gel that is easy to process by cutting, bending, or the like. Because the sheet-shaped gel of the present invention can be readily processed into a shape, in the case where it is processed into a concavo-convex shape or a bellows shape, for example, the amount of the gel to be charged per unit volume can be increased.

The term "sheet-shaped" means that, as described in Example 5, after the sheet is prepared and then folded, it can retain the shape of the sheet without being cut in the folds, and the folds remain and the sheet can retain its processed shape.

The sheet-shaped gel of the present invention has a breaking strain ratio (%) of 100% or less, preferably 80% or less, more preferably 60% or less, even more preferably 40% or less, and most preferably 20% or less, as measured in the measurement of tensile breaking stress described below.

The content of the solvent in the sheet-shaped gel of the present invention is identical to that in the dry gel described above.

[Method for Producing a Hydrogel]

The method for producing a hydrogel of the present invention is not limited to a particular method, as long as the water-soluble organic polymer (A), the silicate (B), the dispersant (C) for the silicate, and the water-absorbing polymer (D), as well as optionally the reinforcing material (E), one or more solvents selected from the group consisting of water and the water-soluble organic solvent (F), and other additives are mixed. Examples of the method include a method in which the water-soluble organic polymer (A), the silicate (B), the dispersant (C) for the silicate, and the water-absorbing polymer (D) are mixed in predetermined proportions, and optionally the reinforcing material (E), one or more solvents selected from the group consisting of water and the water-soluble organic solvent (F), and additives are further added thereto and mixed; and a method in which an aqueous solution of the water-soluble organic polymer (A) and an aqueous dispersion of the silicate (B) and the dispersant (C) for the silicate are prepared in advance, the water-absorbing polymer (D), and optionally the reinforcing material (E) and additives are added to the aqueous solution of the water-soluble organic polymer (A), and then the aqueous dispersion of the silicate (B) and the dispersant (C) for the silicate is mixed into the mixture, and, as necessary, during mixing, one or more water-soluble organic solvents are further added thereto and mixed.

As a method of mixing the components in the aqueous solution or the aqueous dispersion, mechanical or manual stirring, or ultrasonication can be used, and mechanical stirring is preferred. For mechanical stirring, a magnetic stirrer, a propeller-type stirrer, a planetary centrifugal mixer, a disperser, a homogenizer, a shaker, a vortex mixer, a ball mill, a kneader, a line mixer, or an ultrasonic oscillator, for example, can be used. Among the above, mixing with a magnetic stirrer, a propeller-type stirrer, a planetary centrifugal mixer, or a line mixer is preferred.

The temperature during mixing of the above-described liquid to be prepared (the aqueous solution or the aqueous dispersion) is from the freezing point to the boiling point of the aqueous solution or the aqueous dispersion, and is preferably −5 to 100° C., and more preferably 0 to 50° C.

The mixture immediately after being mixed is a sol with a low strength, but it forms a gel by being allowed to stand. The time during which the mixture is allowed to stand is preferably 2 to 100 hours. The temperature at which the mixture is allowed to stand is −5 to 100° C., and preferably 0 to 50° C. Moreover, the mixture immediately after being mixed, before gelation, can be poured into a mold or extrusion-molded to prepare a gel having a desired shape. Furthermore, a gel formed into a thin film like a sheet can be prepared by coating or spin coating.

Furthermore, in the method for producing a hydrogel of the present invention, optionally, the content of the solvent in the hydrogel can be adjusted by removing a portion of at least one solvent selected from the group consisting of water and the water-soluble organic solvent (F) in the hydrogel obtained above. In this manner, the degrees of the water absorbency, flexibility, shape stability, and shape retention properties of the resulting final hydrogel can be adjusted. The method of removing the solvent is as described in [Dry gel].

The above-described content is 50 to 99% by mass, preferably 60 to 98% by mass, and more preferably 70 to 95% by mass.

In the method for producing a hydrogel of the present invention, it is not always necessary to perform the solvent removal; it is not necessary to perform the solvent removal in the case where the hydrogel already exhibits the required water absorbency, flexibility, shape stability, and shape retention properties at the time when the hydrogel is formed.

[Method for Producing a Dry Gel]

The method for producing a dry gel of the present invention comprises:

(a2) a formation step of forming a gel comprising a water-soluble organic polymer (A), a silicate (B), a dispersant (C) for the silicate, a water-absorbing polymer (D), and at least one solvent selected from the group consisting of water and a water-soluble organic solvent (F); and when the content of the solvent in the gel is 50% by mass or more, (b2) a solvent removal step of removing a portion or all of the solvent in the gel to adjust the content of the solvent in the gel to less than 50% by mass.

The above-described content is 0 to 49% by mass, preferably 0 to 30% by mass, and more preferably 0 to 20% by mass.

Furthermore, in the method for producing a dry gel of the present invention, it is not always necessary to perform the solvent removal when the content of the solvent in the gel formed in the formation step (a2) is less than 50% by mass; however, the degrees of the water absorbency, flexibility, shape stability, and shape retention properties of the resulting dry gel can be adjusted by performing the solvent removal.

The method of forming the gel and the method of removing the solvent are as described in [Method for producing a hydrogel] above.

[Method for Producing a Sheet-Shaped Gel]

The method for producing a sheet-shaped gel of the present invention comprises:

(a3) a formation step of forming a sheet-shaped gel comprising a water-soluble organic polymer (A), a silicate (B), a dispersant (C) for the silicate, a water-absorbing polymer (D), and at least one solvent selected from the group consisting of water and a water-soluble organic solvent (F); and when the content of the solvent in the gel is 50% by mass or more, (b3) a solvent removal step of removing a portion or all of the solvent in the gel to adjust the content of the solvent in the gel to less than 50% by mass.

In the formation step (a3), examples of the method of making the gel sheet-shaped include a method in which a solution obtained by mixing the components is poured into a flat-shaped container (for example, a stainless steel vat), and allowed to gel.

The above-described content is 0 to 49% by mass, preferably 0 to 30% by mass, and more preferably 0 to 20% by mass.

Furthermore, in the method for producing a sheet-shaped gel of the present invention, it is not always necessary to perform the solvent removal when the content of the solvent in the sheet-shaped gel formed in the formation step (a3) is less than 50% by mass; however, the degrees of the water absorbency, flexibility, shape stability, and shape retention properties of the resulting sheet-shaped gel can be adjusted by performing the solvent removal.

The method of forming the gel and the method of removing the solvent are as described in [Method for producing a hydrogel] above.

[Content of the Solvent in the Gel]

The content of the solvent in the gel before the solvent removal can be calculated from the amount of water and the volatile solvent added, and the amount of all the components. The content of the solvent in the gel after the solvent removal can be calculated by assuming all the change in the mass of the gel before and after the solvent removal step to be the amount of decrease in the amount of water and the volatile solvent.

A preferred content of the solvent in the gel is as described in [Method for producing a hydrogel] with respect to the hydrogel, and as described in [Method for producing a dry gel] with respect to the dry gel.

[Measurement of the Degree of Water Absorption of the Hydrogel]

The degree of water absorption of the hydrogel can be calculated by, for example, immersing the hydrogel in water to allow it to absorb water until the hydrogel substantially ceases to absorb water, and by dividing the mass of the hydrogel after water absorption by the mass of the hydrogel before water absorption.

A preferred degree of water absorption is as described in [Water-absorbing hydrogel].

[Measurement of the Water Absorption Rate of the Gel]

The water absorption rate of the gel can be calculated by, for example, immersing small pieces of the dry gel (the content of the solvent in the gel is less than 50% by mass) in pure water, measuring the mass of the gel per hour, and calculating the water absorption rate in accordance with the equation: [change in the mass (g) of the gel per hour of immersion in water/mass (g) of the dry gel as a specimen=amount of water absorption (g)/h of 1 g of the dry gel].

The water absorption rate of the gel of the present invention is 5 to 50 g/h, and preferably 15 to 50 g/h.

[Measurement of the Strength of the Gel]

The strength or stretchability of the gel can be determined by measuring the stress to break and the strain to break by a tensile breaking test, for example.

For example, measurement of tensile breaking stress can be performed using Autograph AGS-X500N from Shimadzu Corporation. The measurement method is as follows: the sheet-shaped gel having a thickness of 1 mm is cut into 10 mm in width and 70 mm in length, 10 mm from both ends of the gel is held between jigs and pulled at a rate of 10 mm per minute, and the stress to break and the strain ratio to break are measured.

The breaking stress of the gel of the present invention as measured by the measurement of tensile breaking stress is 500 to 10,000 kPa; for applications that require strength, the lower limit is 500, 800, or 1,000 kPa, for example, and the upper limit is 2,000, 5,000, or 10,000 kPa, for example. Examples of the range include 500 to 5,000 kPa and 2,000 to 10,000 kPa.

On the other hand, the tensile breaking strain ratio that represents stretchability is 0.1 to 50%; for applications that require a low strain ratio, the lower limit is 5, 10, or 20%, for example, and the upper limit is 20, 30, or 50%, for example. Examples of the range include 5 to 20% and 10 to 50%.

EXAMPLES

The present invention will be specifically described next with reference to examples; however, the present invention is not limited to these examples.

Production Example 1: Production of a 6% Aqueous Dispersion of LAPONITE XLG 7 parts of a 35% aqueous solution of low-polymerization-degree sodium polyacrylate (average molecular weight: 15,000; from Sigma Aldrich Co. LLC), 10 parts of glycerin (from Junsei Chemical Co., Ltd.), 0.5 parts of phenoxyethanol (from Junsei Chemical Co., Ltd.), and 70.5 parts of water were mixed, and the mixture was stirred at 25° C. until it formed a homogeneous solution. To this solution, 6 parts of LAPONITE XLG (from BYK Additives & Instruments, Co., Ltd.) was gradually added, and, after the mixture was homogeneously dispersed, 3 parts of a 10% aqueous solution of citric acid (from Junsei Chemical Co., Ltd.) was added thereto. The mixture was heated to 80° C. with vigorous stirring, and the stirring at 80° C. was continued for 30 minutes; thereafter, the mixture was stirred with cooling to 25° C. in an ice-water bath, 3 parts of a 10% aqueous solution of citric acid (from Junsei Chemical Co., Ltd.) was added thereto, and then the mixture was vigorously stirred for 1 hour to obtain a target product.

Production Example 2: Production of a 2% Aqueous Solution of Sodium Polyacrylate 10 parts of glycerin (from Junsei Chemical Co., Ltd.), 1.5 parts of disodium hydrogen citrate 1.5-hydrate (from Junsei Chemical Co., Ltd.), 0.5 parts of phenoxyethanol (from Junsei Chemical Co., Ltd.), and 86 parts of water were mixed, and the mixture was stirred at 25° C. until it formed a homogeneous solution. While this solution was vigorously stirred, 2 parts of high-polymerization-degree sodium polyacrylate (VISCOMATE NP-800; from Showa Denko K.K.) was gradually added thereto; thereafter, vigorous stirring at 25° C. was continued (about 5 hours) until the high-polymerization-degree sodium polyacrylate completely dissolved to obtain a target product.

Production Example 3: Production of a 20% Aqueous Dispersion of LAPONITE XLG 7.5 parts of a 20% aqueous solution of etidronate disodium (CHELEST PH-212; from Chelest Corporation), 0.5 parts of phenoxyethanol (from Junsei Chemical Co., Ltd.), and 72 parts of water were mixed, and the mixture was stirred at 25° C. until it formed a homogeneous solution. To this solution, 20 parts of LAPONITE XLG (from BYK Additives & Instruments, Co., Ltd.) was gradually added. The mixture was heated to 80° C. with vigorous stirring, and the stirring at 80° C. was continued for 30 minutes; thereafter, the mixture was cooled to 25° C. in an ice-water bath to obtain a target product.

Production Example 4: Production of a 2% Aqueous Solution of Sodium Polyacrylate While 98 parts of water was vigorously stirred, 2 parts of high-polymerization-degree sodium polyacrylate (ARON-VIS MX; from Toagosei Co., Ltd., weight average molecular weight: 2,000,000 to 3,000,000) was gradually added thereto; thereafter, vigorous stirring at 25° C. was continued (about 5 hours) until the high-polymerization-degree sodium polyacrylate completely dissolved to obtain a target product.

Comparative Example 1: Production of Sheet-Shaped Gel 1

20 mL of the 6% aqueous dispersion of LAPONITE XLG produced in Production Example 1 and 20 mL of water were added and stirred at 25° C. for 10 minutes. To this mixture, 20 mL of the 2% aqueous solution of sodium polyacrylate produced in Production Example 2 was added, and the mixture was vigorously stirred at 25° C. for 1 minute. The mixture was uniformly poured into a petri dish with a diameter of 12 cm, and, without being covered with a lid, it was dried at room temperature for 72 hours to obtain a target product. The content of the solvent in the target product was 94% by mass before drying, and 27% by mass after drying.

Comparative Example 2: Production of Sheet-Shaped Gel 2

48.2 parts of the 2% aqueous solution of sodium polyacrylate produced in Production Example 4, 48.2 parts of water, and 1.2 parts of glycerin were added and vigorously stirred until homogeneity. This mixture was cooled with ice, 2.4 parts of the 20% aqueous dispersion of LAPONITE XLG produced in Production Example 3 was added thereto, and the mixture was vigorously stirred for 1 minute. This mixture was poured into a stainless steel vat, and dried in an oven at 80° C. for 15 hours to obtain a target product. The content of the solvent in the target product was 97% by mass before drying, and 22% by mass after drying.

Example 1: Production of Sheet-Shaped Gel 3

20 mL of the 6% Aqueous Dispersion of LAPONITE XLG Produced in Production Example 1, 0.5 g of AQUALIC CA (from Nippon Shokubai Co., Ltd.), 0.5 g of polyvinyl alcohol (KURARAY POVAL PVA 217; from Kuraray), and 20 mL of water were added and stirred at 25° C. for 10 minutes. To this mixture, 20 mL of the 2% aqueous solution of sodium polyacrylate produced in Production Example 2 was added, and the mixture was vigorously stirred at 25° C. for 1 minute. The mixture was uniformly poured into a petri dish with a diameter of 12 cm, and, without being covered with a lid, it was dried at room temperature for 72 hours to obtain a target product. The content of the solvent in the target product was 96% by mass before drying, and 28% by mass after drying.

Example 2: Production of Sheet-Shaped Gel 4

To 1.5 parts of a reinforcing material (cellulose filter paper was ground and used), 50 parts of water and 1.2 parts of glycerin were added, and the reinforcing material was dispersed with stirring. To this mixture, 44.2 parts of the 2% aqueous solution of sodium polyacrylate produced in Production Example 2 and 0.4 parts of AQUALIC CA (from Nippon Shokubai Co., Ltd.) were sequentially added, and the mixture was vigorously stirred until homogeneity. The mixture was cooled with ice, 2.2 parts of the 20% aqueous dispersion of LAPONITE XLG produced in Production Example 3 and subsequently 0.5 parts of a surfactant (TAYCAPOWER BN2060; from Tayca Corporation) were added thereto, and the mixture was vigorously stirred for 1 minute. This mixture was poured into a stainless steel vat, and dried in an oven at 80° C. for 15 hours to obtain a target product. The content of the solvent in the target product was 95% by mass before drying, and 22% by mass after drying.

Example 3: Water Absorption Test of Sheet-Shaped Gels

About 1 g of each of the sheet-shaped gels 1 and 3 produced in Comparative Example 1 and Example 1, respectively, was immersed in 1 liter of pure water, and the mass of each gel was measured for every predetermined time. Table 1 shows changes in the mass of the gel due to water absorption and the water absorption rate per hour.

TABLE 1

| Time | Sheet-Shaped Gel 1 (Comparative Example 1) Mass of the Gel [Water Absorption Rate (g/h)] | Sheet-Shaped Gel 3 (Example 1) Mass of the Gel [Water Absorption Rate (g/h)] |
| --- | --- | --- |
| 0 | 1.05 g [—] | 1.00 g [—] |
| 0.5 | 7.29 g [12.48] | 14.93 g [27.86] |
| 1 | 13.16 g [11.74] | 27.75 g [25.64] |
| 2 | 23.51 g [10.35] | 45.21 g [17.46] |
| 3 | 34.13 g [10.62] | 60.40 g [15.19] |

The results of Table 1 show that the sheet-shaped gel 3 of Example 1 had a water absorption rate higher than that of the sheet-shaped gel 1 of Comparative Example 1, and exhibited superior water absorbency.

Example 4: Tensile Breaking Test of Sheet-Shaped Gels

A tensile breaking test was performed using each of the sheet-shaped gels having a thickness of 1 mm produced in Comparative Example 2 and Example 2. The testing method was as follows: using Autograph AGS-X500N from Shimadzu Corporation, the sheet-shaped gel having a thickness of 1 mm was cut into 10 mm in width and 70 mm in length, 10 mm from both ends of the gel was held between jigs and pulled at a rate of 10 mm per minute, and the stress to break and the strain ratio to break were measured. Table 2 shows the breaking stress and the breaking strain ratio of each of the sheet-shaped gels of Comparative Example 2 and Example 2. Each of the measurement results was obtained by calculating the average value of three measurements.

TABLE 2

| Specimen | Breaking Stress (kPa) | Breaking Strain Ratio (%) |
| --- | --- | --- |
| Sheet-Shaped Gel 2 (Comparative Example 2) | 151 | 176 |
| Sheet-Shaped Gel 4 (Example 2) | 3338 | 20 |

The results of Table 2 show that the sheet-shaped gel 4 of Example 2 had a strain lower than that of the sheet-shaped gel 2 of Comparative Example 2, and exhibited a high breaking stress. Thus, the sheet-shaped gel 4 of Example 2 was shown to have shape stability.

Example 5: Bending Test of Sheet-Shaped Gels

Figure 2:
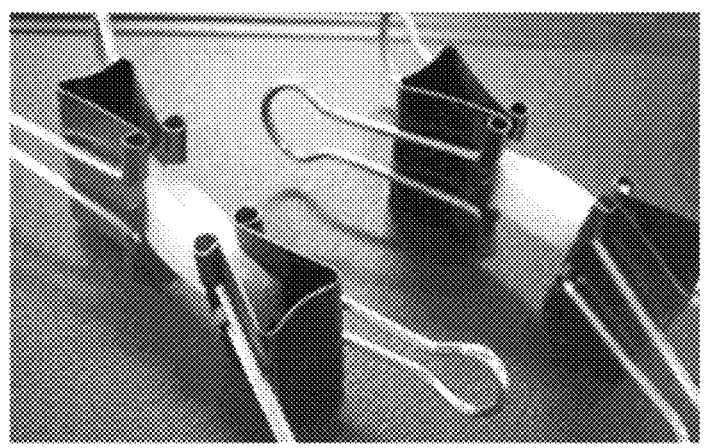
FIG. 2 is a photograph showing sheet-shaped gels during the bending test in Example 5 (the left one is the sheet-shaped gel of Comparative Example 2, and the right one is the sheet-shaped gel of Example 2).

Each of the sheet-shaped gels having a thickness of 1 mm produced in Comparative Example 2 and Example 2 (in FIG. 1, the left one is the sheet-shaped gel of Comparative Example 2, and the right one is the sheet-shaped gel of Example 2; the same applies to FIGS. 2 and 3) was folded into a bellows shape, and both ends were fixed with clips for 10 minutes (FIG. 2). After 10 minutes, one of the clips was removed, and the folded states of the sheet-shaped gels were compared (FIG. 3).

Figure 3:
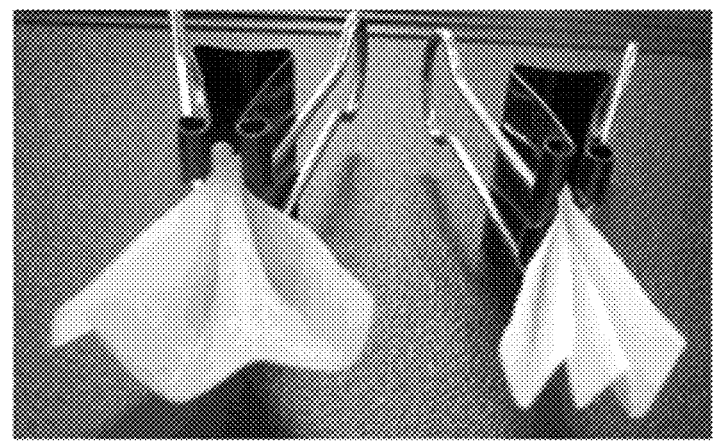
FIG. 3 is a photograph showing the results of the bending test in Example 5 (the left one is the sheet-shaped gel of Comparative Example 2, and the right one is the sheet-shaped gel of Example 2).

FIG. 3 shows that the folds clearly remained in the sheet-shaped gel of Example 2 at the right, whereas the folds were not made and gradually spread in the sheet-shaped gel of Comparative Example 2 at the left.

Thus, the sheet-shaped gel of Example 2 was shown to have the property of substantially retaining the bellows shape (shape retention properties), while having a degree of flexibility such that the sheet-shaped gel is not broken even though it is folded into the bellows shape.

INDUSTRIAL APPLICABILITY

The gel of the present invention is easy to produce, and moreover, the viscoelastic properties of the gel such as breaking strength and deformation ratio can be adjusted by adjusting the solids concentration by evaporating the solvent content. Furthermore, the obtained gel has high transparency and elasticity, and is also easy to process. Furthermore, various water-soluble organic solvents can be added to the gel of the present invention. By utilizing this property, the gel of the present invention can be applied to various products.

Examples of such products include medical materials including external medicine base materials such as wound dressings, cataplasms, and hemostatic materials, sealant materials for surgery, scaffolding materials for regenerative medicine, implant materials such as artificial corneas, artificial lenses, artificial vitreous bodies, artificial skin, artificial joints, artificial cartilage, and materials for breast augmentation, and materials for soft contact lenses, medium materials for tissue culturing, microbial culturing, and the like, cosmetic materials such as sheets for packs, sanitary materials such as diapers for children and adults and sanitary napkins, gel materials for fragrances and deodorants, confectionery and gum materials for dogs, materials for chromatographic carriers, materials for bioreactor carriers, materials for separation function membranes, building/civil construction materials such as noncombustible materials for construction, fire-resistant covering materials, humidity control materials, refrigerants, earthquake-proof buffer materials, mudflow preventing materials, and sandbags, greening materials such as soil water retention agents, raising media, and agricultural and horticultural hydroponic supports, toy materials such as children's toys and models, materials for stationeries, shock absorbing materials for sporting goods such as sports shoes and protectors, cushion materials for shoe soles, buffer materials for bullet-proof vests, buffer materials for automobiles and the like, buffer materials for transportation, packing materials, buffering/protecting mat materials, shock buffering materials within electronic devices, buffer materials for transporting wagons for precision components such as optical devices and semiconductor-related components, vibration-proof/damping materials for industrial equipment, sound reduction materials for industrial equipment such as motor-using equipment and compressors, coating materials for frictional parts of environment-conscious material apparatuses such as rubber alternative materials for tires and rubber bands and alternative materials for plastics, coating additives, waste disposal such as gelators for waste mud and lost circulation preventing agents, adhesive materials, sealants for sealing, electronic materials such as gel electrolyte materials for primary cells, secondary cells, and capacitors, gel electrolyte materials for dye-sensitized solar cells, and materials for fuel cells, and materials for photographic films.

The invention claimed is:

1. A method for producing a sheet-shaped gel comprising:
a formation step of forming a sheet-shaped gel comprising a water-soluble organic polymer (A), a silicate (B), a dispersant (C) for the silicate, a water-absorbing polymer (D), wherein the water-absorbing polymer (D) is at least one selected from the group consisting of a crosslinked polyacrylate and a crosslinked polyvinyl sulfonate, and a content of the water-absorbing polymer (D) in the sheet-shaped gel is 0.01 to 20% by mass, relative to 100% by mass of the sheet-shaped gel, a reinforcing material (E), wherein the reinforcing material (E) is a fiber, and a content of the fiber in the sheet-shaped gel is 0.5 to 10% by mass, relative to 100% by mass of the sheet-shaped gel, and a solvent (F) consisting of water, wherein a content of the solvent in the sheet-shaped gel is 70-95% by mass, relative to 100% by mass of the sheet-shaped gel; and
performing a solvent removal step of removing a portion or all of the solvent in the sheet-shaped gel to adjust the content of the solvent in the sheet-shaped gel to less than 50% by mass.

2. A sheet-shaped hydrogel comprising
a water-absorbing hydrogel comprising
a water-soluble organic polymer (A),
a silicate (B),
a dispersant (C) for the silicate,
a water-absorbing polymer (D), wherein the water-absorbing polymer (D) is at least one selected from the group consisting of a crosslinked polyacrylate and a crosslinked polyvinyl sulfonate, and a content of the water-absorbing polymer (D) in the hydrogel is 0.01 to 20% by mass, relative to 100% by mass of the hydrogel, and
a reinforcing material (E), wherein the reinforcing material (E) is a fiber, and a content of the fiber in the hydrogel is 0.5 to 10% by mass, relative to 100% by mass of the hydrogel, and
a solvent (F) consisting of water, wherein a content of the solvent in the hydrogel is 70-95% by mass, relative to 100% by mass of the hydrogel.

3. The sheet-shaped hydrogel according to claim 2, wherein the fiber is at least one selected from the group consisting of pulp, cellulose fibers, rayon fibers, nylon fibers, polyester fibers, polypropylene fibers, acrylic fibers, vinylon fibers, aramid fibers, acetate fibers, and glass fibers.

4. The sheet-shaped hydrogel according to claim 2, wherein the water-soluble organic polymer (A) is a fully or partially neutralized polyacrylate having a weight average molecular weight of 1,000,000 to 10,000,000.

5. The sheet-shaped hydrogel according to claim 2, wherein the silicate (B) is at least one water-swellable silicate particle selected from the group consisting of smectite, bentonite, vermiculite, and mica.

6. The sheet-shaped hydrogel according to claim 2, wherein the dispersant (C) is at least one selected from the group consisting of a fully or partially neutralized salt of orthophosphoric acid, a fully or partially neutralized salt of pyrophosphoric acid, a fully or partially neutralized salt of tripolyphosphoric acid, a fully or partially neutralized salt of tetraphosphoric acid, a fully or partially neutralized salt of hexametaphosphoric acid, a fully or partially neutralized salt of polyphosphoric acid, a fully or partially neutralized salt of etidronic acid, sodium poly(meth)acrylate, ammonium poly(meth)acrylate, sodium acrylate/sodium maleate copolymer, ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

7. The sheet-shaped hydrogel according to claim 2, wherein the hydrogel has a degree of water absorption such that a mass ratio of the hydrogel after water absorption to the hydrogel before water absorption is twice or more.

* * * * *